Figure 3A:
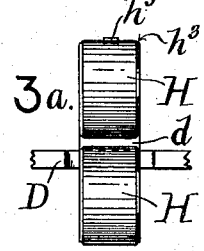

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 1.
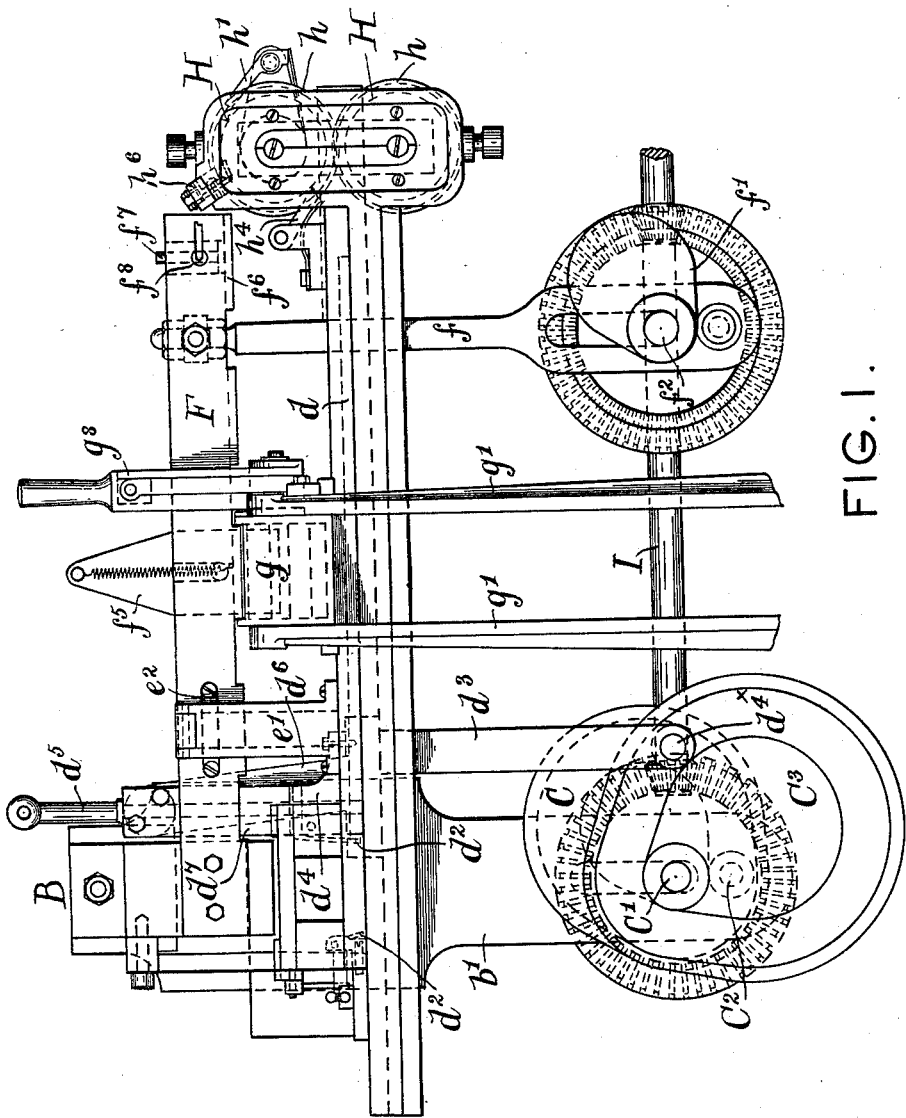
FIG. I.
WITNESSES:
INVENTOR.
Alfred Godfrey.
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 2.
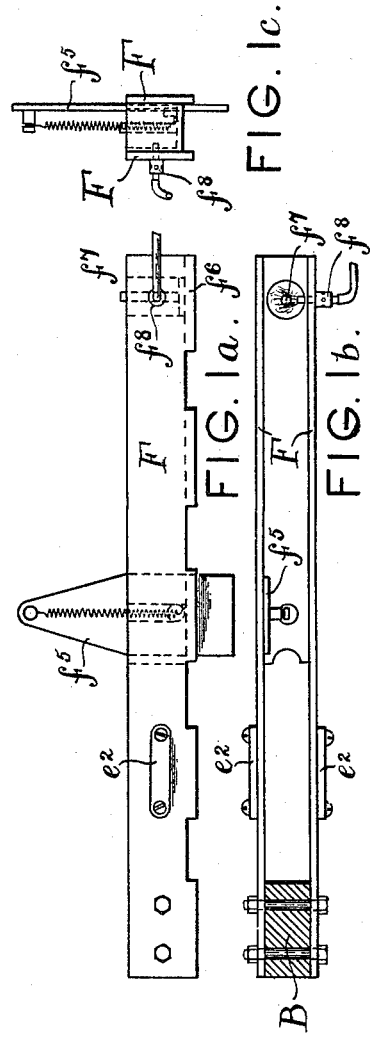
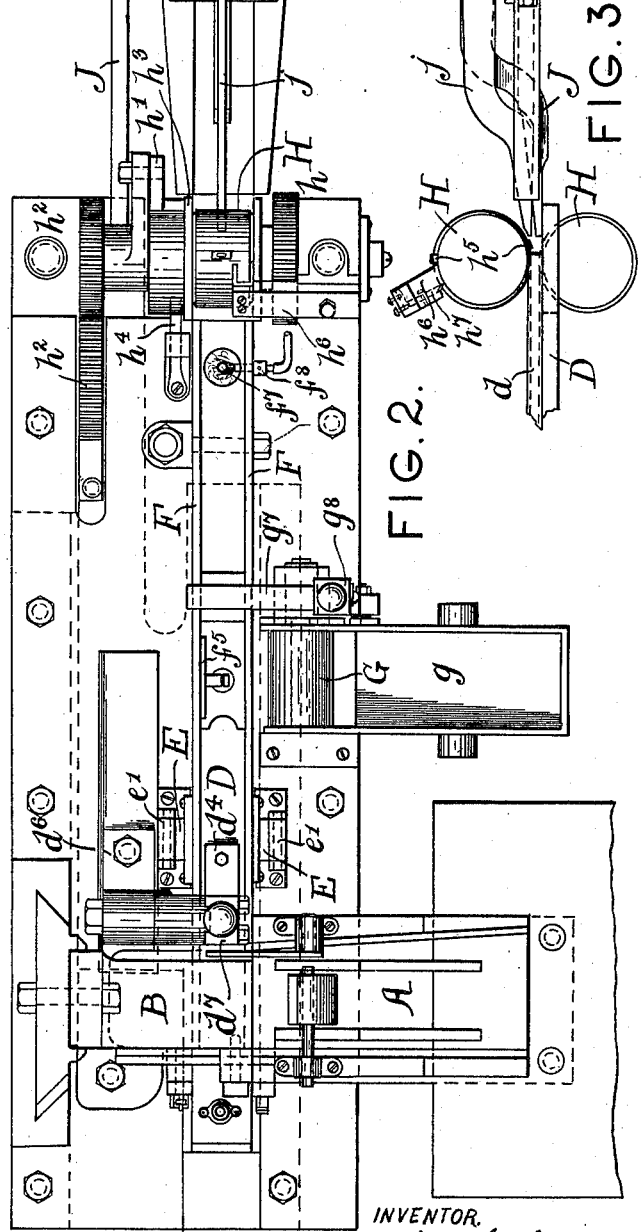
WITNESSES:
INVENTOR.
Alfred Godfrey
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 3.

WITNESSES:
INVENTOR.
Alfred Godfrey.
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 4.

WITNESSES:

INVENTOR.
Alfred Godfrey
BY
ATTORNEYS.

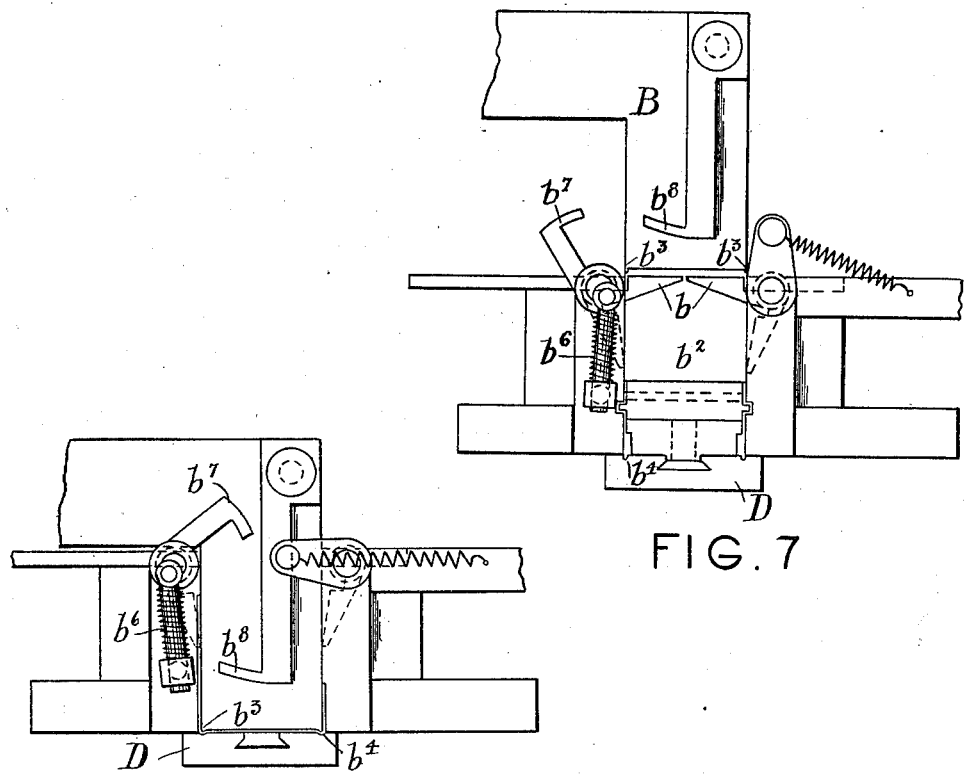
FIG. 7
FIG. 8
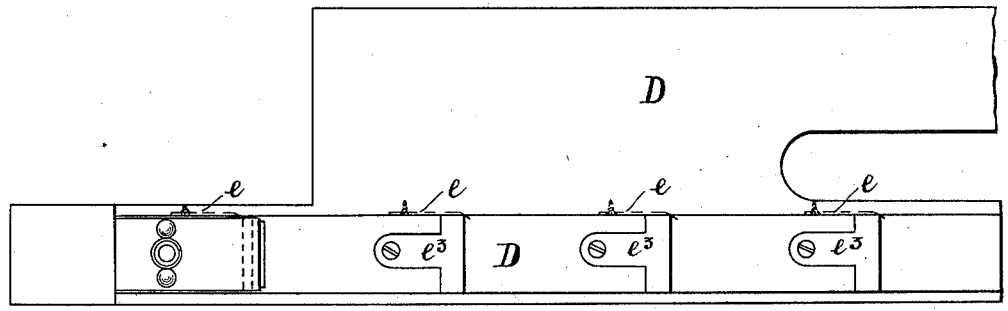
FIG. 7a.
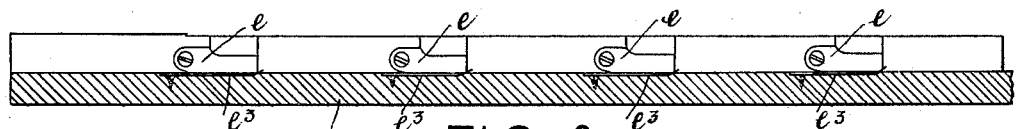
FIG. 8a.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 6.

WITNESSES:
INVENTOR.
Alfred Godfrey.
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 7.

WITNESSES:

INVENTOR.
Alfred Godfrey
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 8.

WITNESSES:

INVENTOR.
Alfred Godfrey.
BY
ATTORNEYS.

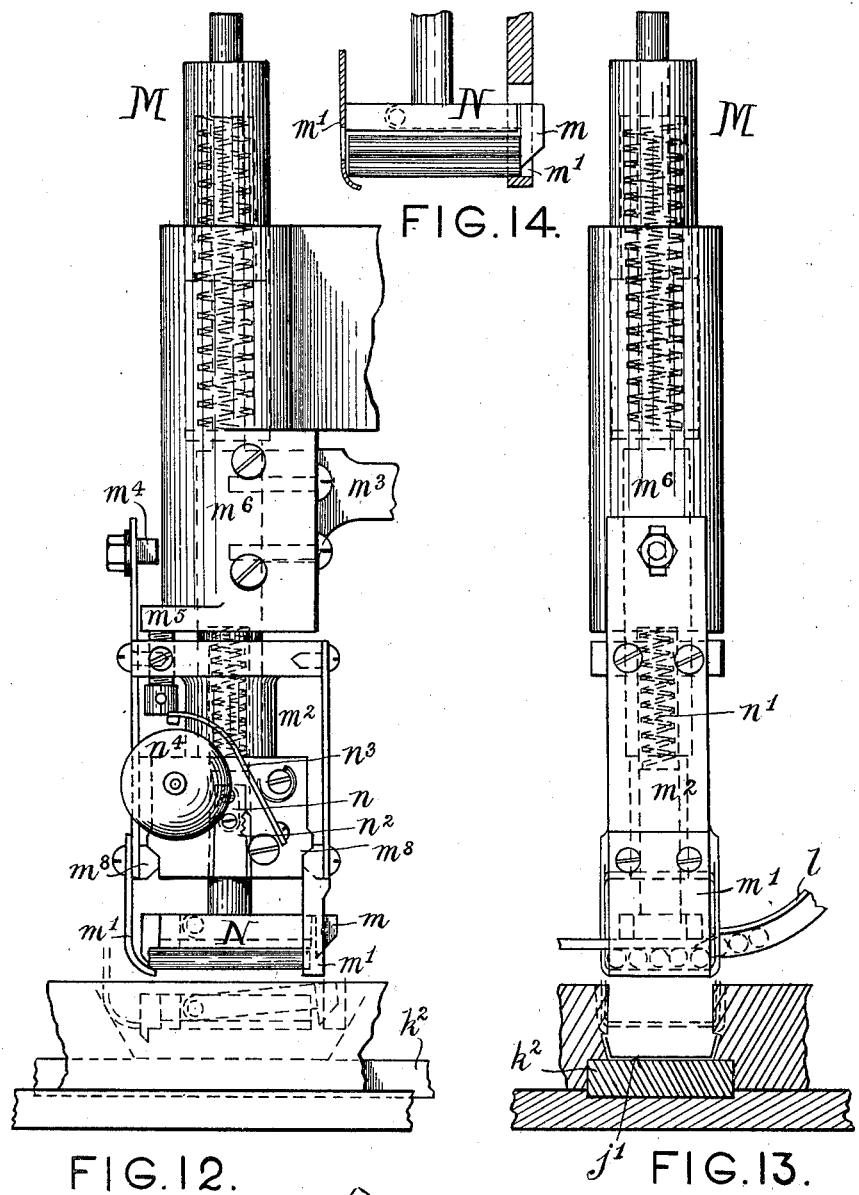
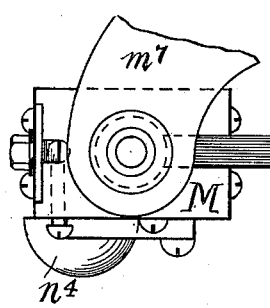

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 10.

WITNESSES:
INVENTOR.
Alfred Godfrey
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 11.

WITNESSES:

INVENTOR.
Alfred Godfrey.
BY
ATTORNEYS.

No. 736,592. PATENTED AUG. 18, 1903.
A. GODFREY.
MACHINE FOR PACKING CIGARETTES OR LIKE GOODS.
APPLICATION FILED FEB. 3, 1902.
NO MODEL. 12 SHEETS—SHEET 12.

WITNESSES:

INVENTOR.
Alfred Godfrey.
BY
ATTORNEYS.

No. 736,592. Patented August 18, 1903.

UNITED STATES PATENT OFFICE.

ALFRED GODFREY, OF LONDON, ENGLAND.

MACHINE FOR PACKING CIGARETTES OR LIKE GOODS.

SPECIFICATION forming part of Letters Patent No. 736,592, dated August 18, 1903.

Application filed February 3, 1902. Serial No. 92,404. (No model.)

*To all whom it may concern:*

Be it known that I, ALFRED GODFREY, residing at London, England, have invented an Improved Machine for Packing Cigarettes or Like Goods, (for which I have made application for Letters Patent in Great Britain, No. 13,804, bearing date July 6, 1901, and No. 19,334, bearing date September 27, 1901,) of which the following is a specification.

This invention relates to an improved combined machine for packing cigarettes and like goods for the market, including the manufacture of cases or shells of paper or like material, the presenting of the same glued and finished to a loaded and packed inner slide, which slide is also formed by the same machine and packed with a definite number of cigarettes or like goods and with added adjuncts thereto. The cases or shells are prepared at one end of the machine and pushed forward automatically with open mouth in a glued and finished condition to receive the inner slides formed at the other end of the machine and packed in their travel toward the case or shell with a definite and required number of cigarettes or like goods or adjuncts, and after these parts are thus automatically prepared and brought together one within the other they are automatically discharged right and left ready for the market, the whole operation being automatically carried out in combination and timing one with another from a single first-motion shaft.

In order that my invention may be the better understood, I will now proceed to describe the same, reference being had to the drawings annexed hereto and to the characters marked thereon.

Figure 4:
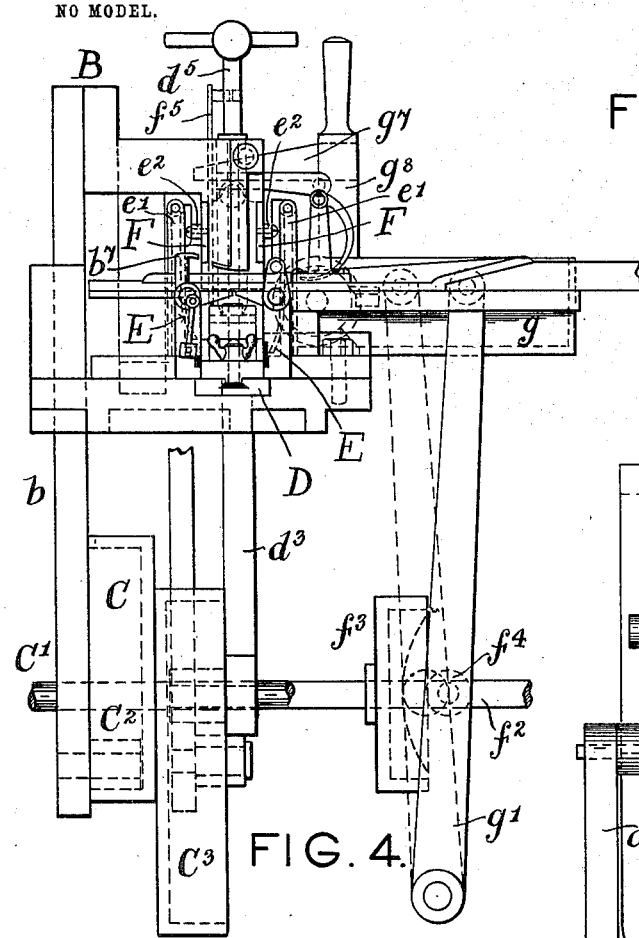
Figure 4A:
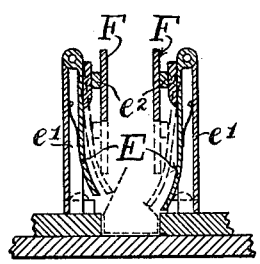
Figure 5:
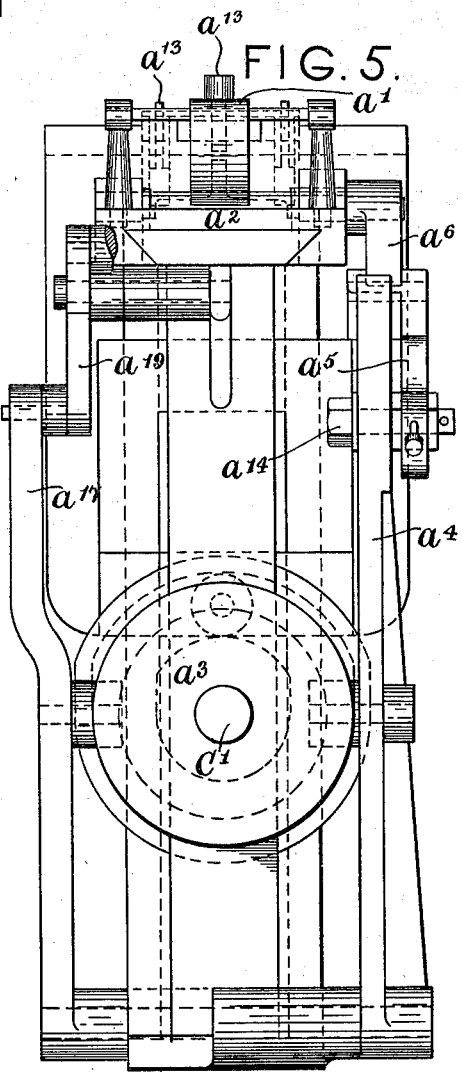
Figure 6:
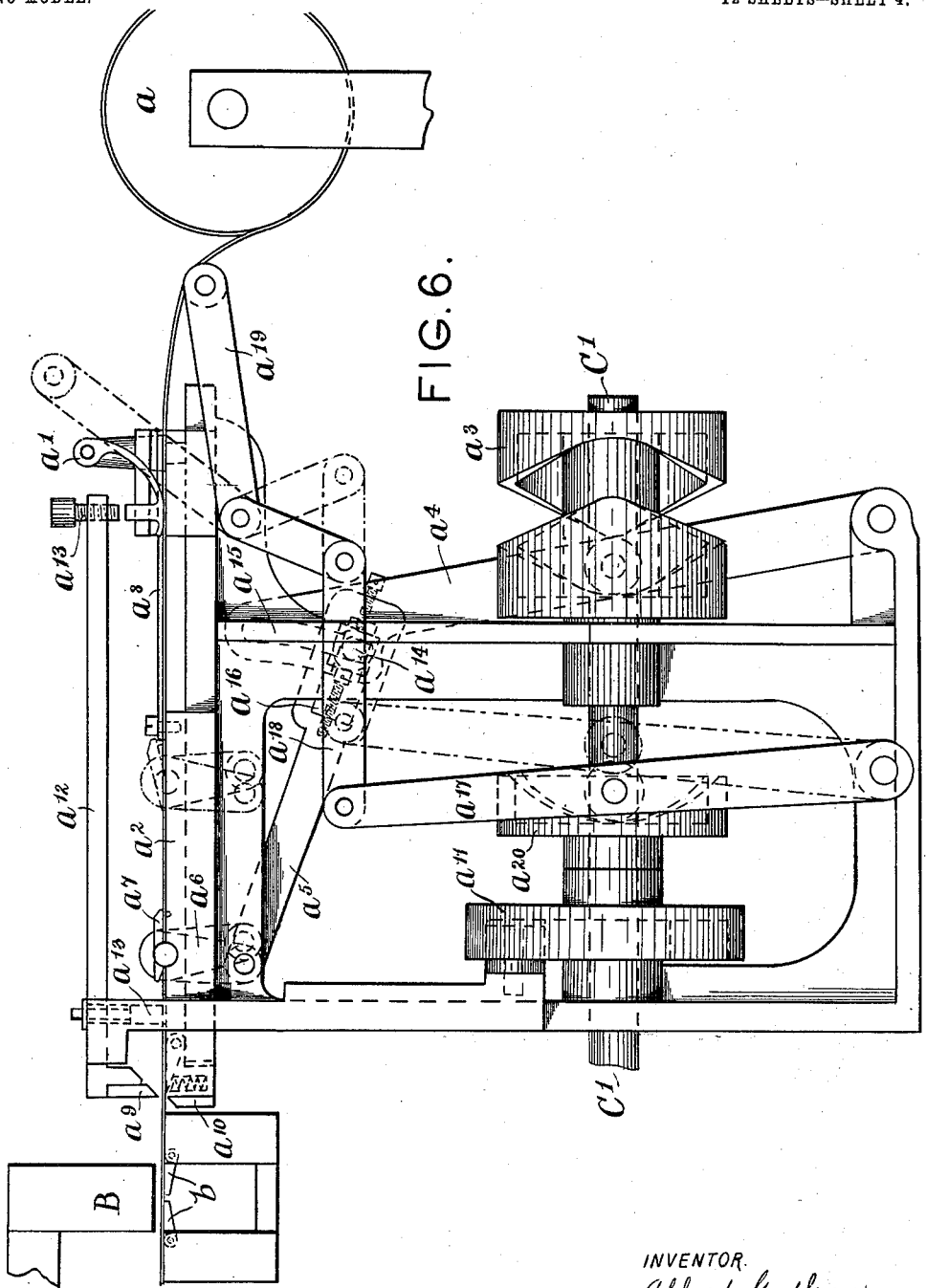
Figure 9B:
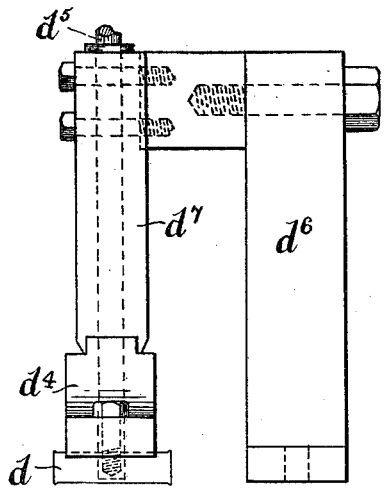
Figure 9A:
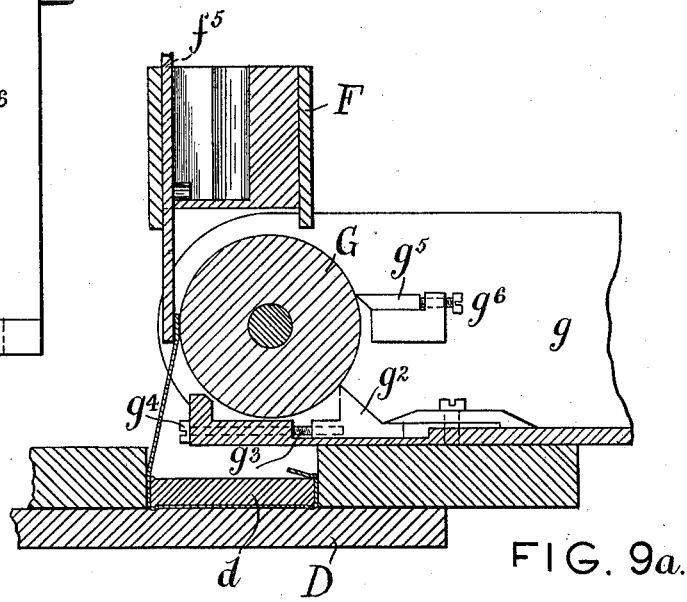
Figure 9C:
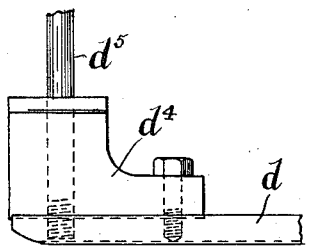
Figure 9:
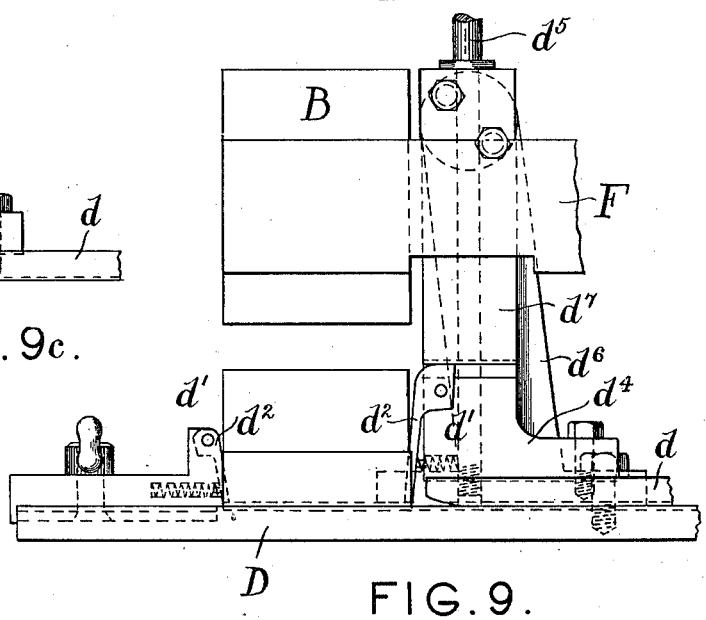
Figure 10:
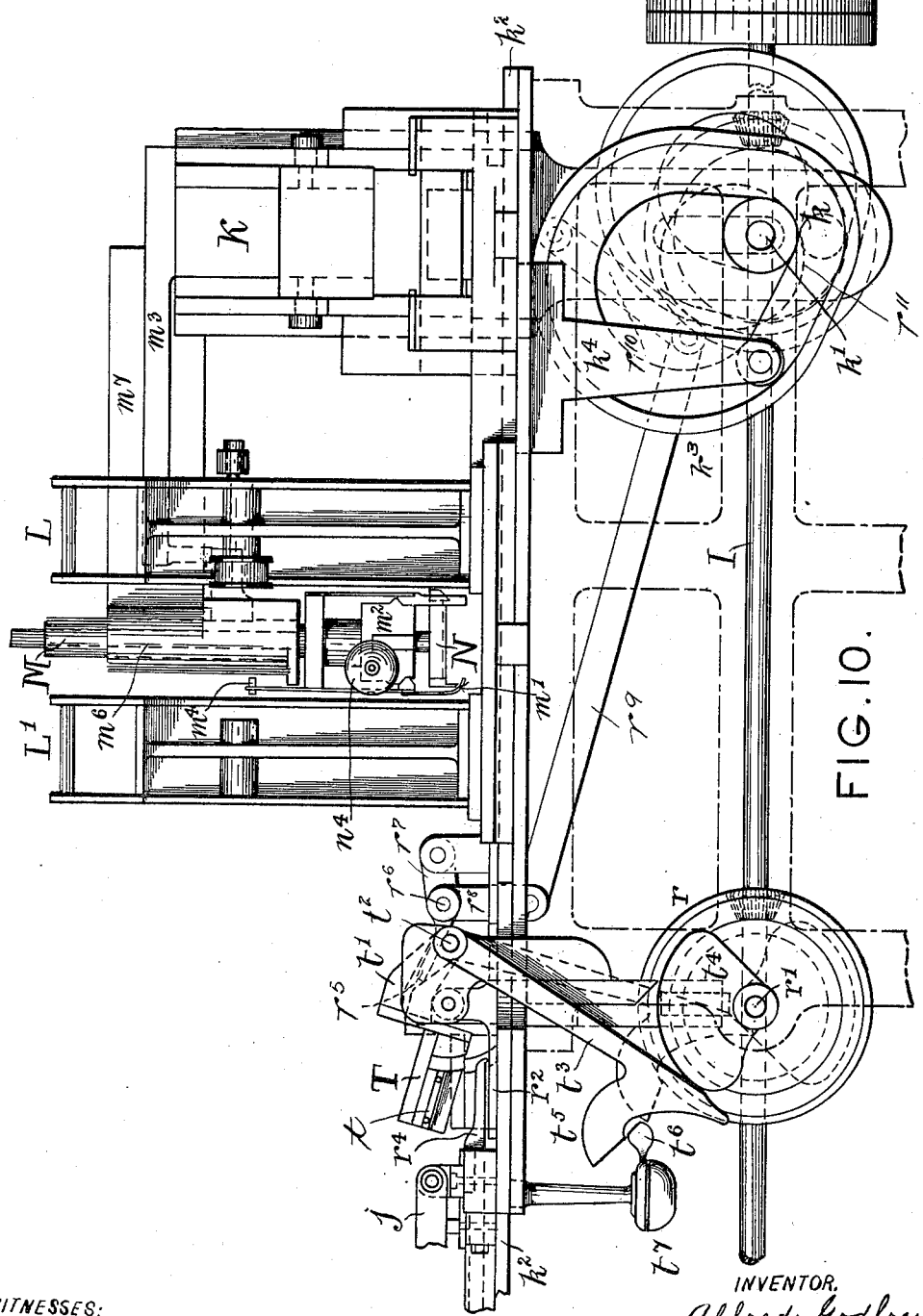
Figure 11:
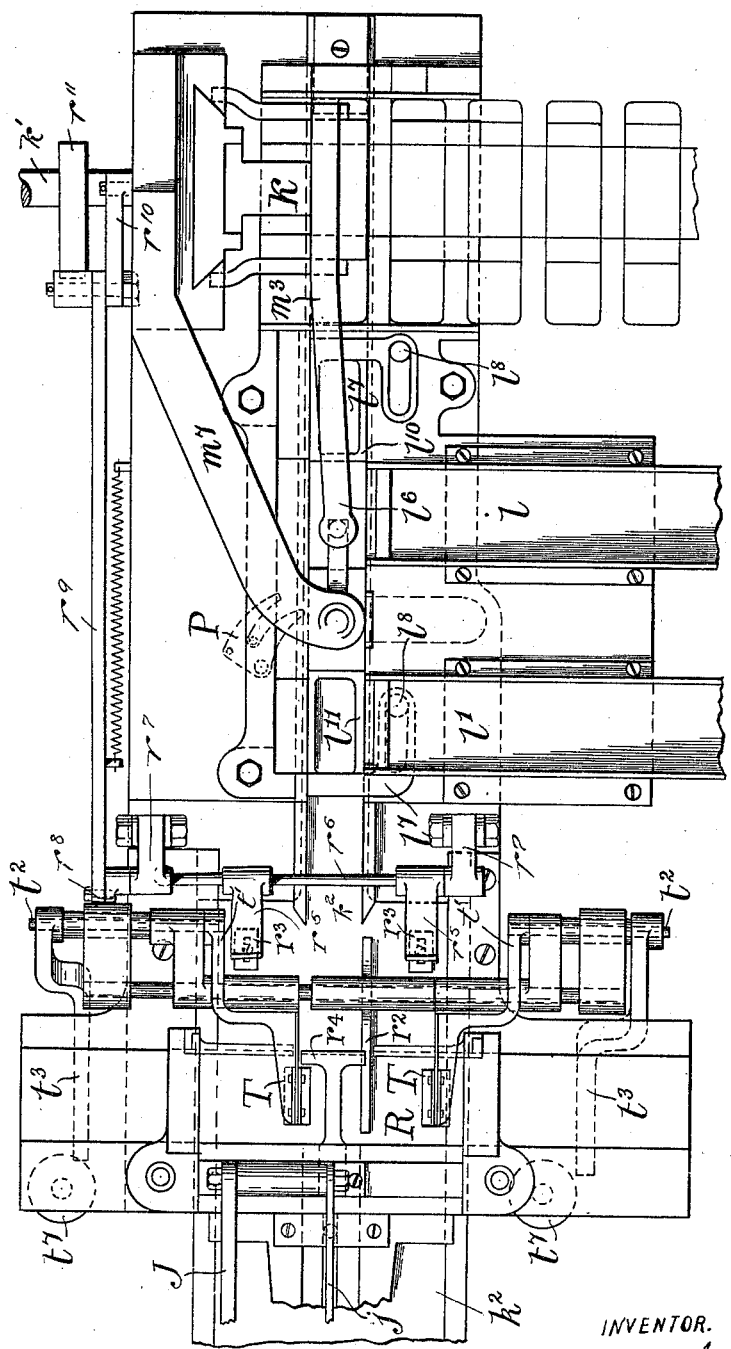
Figure 16:
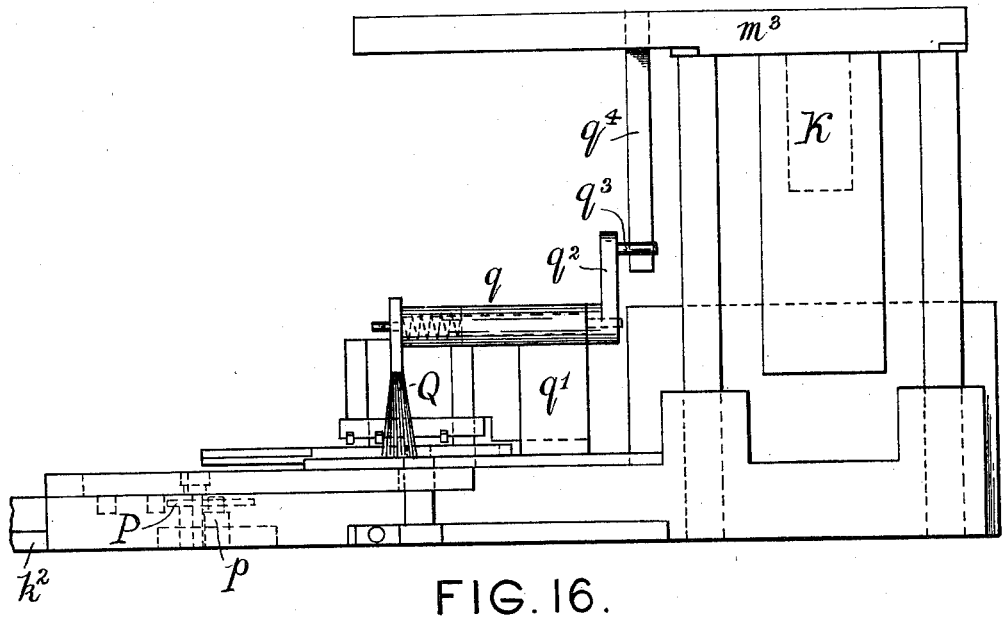
Figure 19:
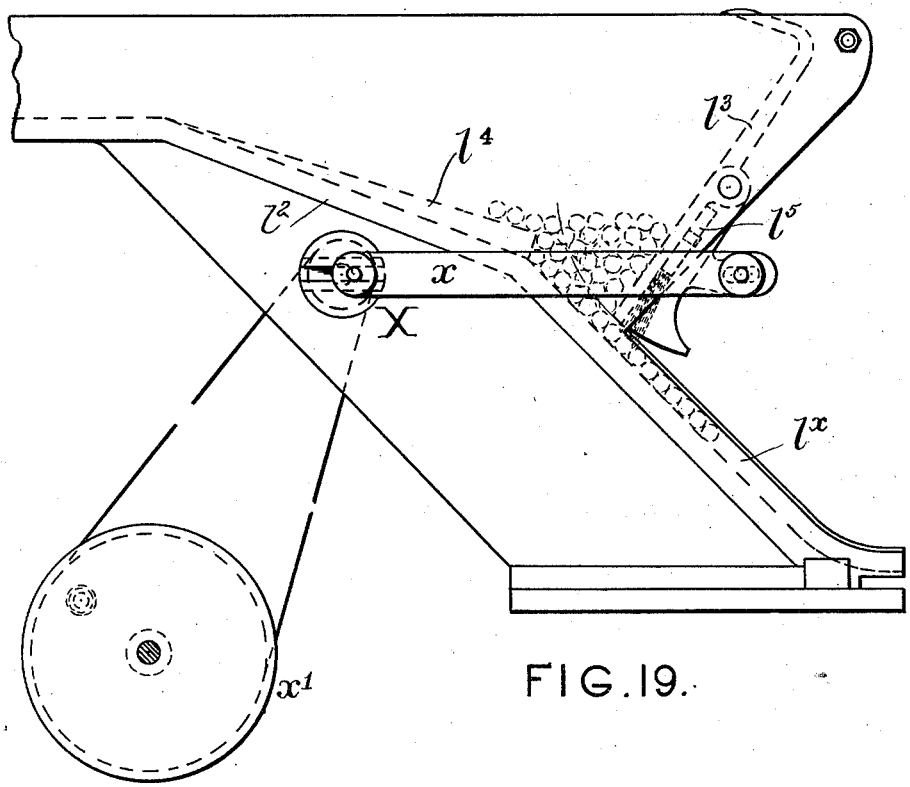
Figure 20:
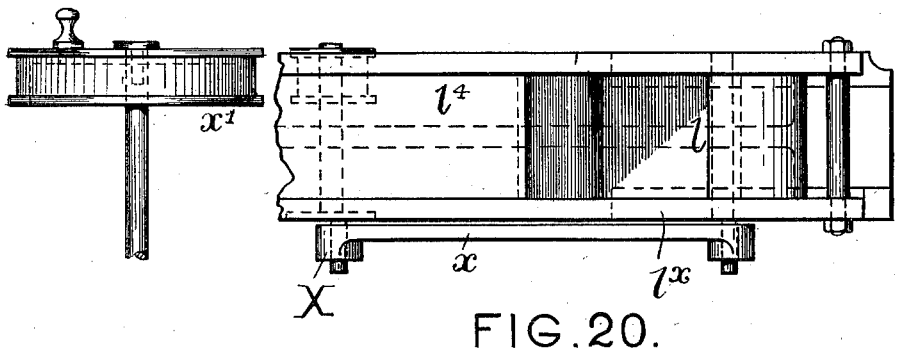

Figure 1 is a general elevation of the outside case or shell preparing and feeding part of my combined packing-machine. Fig. 1$^a$ is a side elevation. Fig. 1$^b$ is a plan, and Fig. 1$^c$ is an end elevation, of a detached detail of the presser-bars. Fig. 2 is a plan of the machine, showing connecting mechanism between outer shell-feed and inner packed slide-supply from the other end of the machine. Fig. 3 is a detached detail elevation of said connecting mechanism. Fig. 3$^a$ is an end view of pressing-rollers. Fig. 4 is an end elevation of the shell making and delivering part of the machine. Fig. 4$^a$ is a cross-section through folding-springs $e$. Fig. 5 is a front elevation, and Fig. 6 is a side elevation, of the registering feed device of the card for making the shells from a reel. Fig. 7 is an enlarged outside detail view of the shell-making die and matrix with the die at its highest point of travel. Fig. 8 is a similar view to Fig. 7 with the die at its lowest point of travel. Fig. 9 is a transverse section to the above elevations of the shell-making die and matrix. Fig. 7$^a$ is a plan, and Fig. 8$^a$ is an elevation in enlarged detail, of the channel in which the outer shell is fed forward to meet the inner slide or tray. Fig. 9$^a$ is a sectional view of the glue-trough. Fig. 9$^b$ is a side elevation of Fig. 9, and Fig. 9$^c$ is a detached elevation of the "former" and its mode of attachment to the reciprocating bed. Fig. 10 is a general elevation of the packing end of the machine for packing the slides with cigarettes and fitting same to the shell. Fig. 11 is a general plan of the same. Figs. 12 and 13 are two enlarged elevations, at right angles to one another, of the packer mechanism. Fig. 14 is a detail of the end of the packer-plunger with double layer of cigarettes. Fig. 15 is an enlarged plan of the top of the packer-plunger and its support. Fig. 16 is an enlarged elevation, Fig. 17, an end elevation, and Fig. 18 a plan, of the details of the moving bed and brush-setter to the cigarette-chute. Fig. 19 is an elevation in enlarged detail, and Fig. 20 is a plan of the cigarette container or hopper.

I will now commence to describe my combined machine at that part which prepares, folds, and glues the outer shell and automatically feeds forward the same to meet the packed inner slide.

To prepare the outer shells, I may start with rectangular blanks of paper, cardboard, or suitable material cut to the required rectangular size and previously printed, or, preferably, may feed from a reel of card or paper previously printed and perforated for register, arranging the special feed and cutting mechanism, as shown hereinafter, so as to feed the required length intermittently to the folding-plunger and matrix. The machine, however, is shown in general elevation and plan for simplicity as being hand-fed by rectangular blanks onto sloping feed-board A, having a fixed "lay" on one side and a spring-finger lay on the other side or having other suitable and well-known means to insure the accurate travel of the blank when automatically pushed forward by feeding-fingers onto a table $b$, Fig. 7, under a vertically-reciprocating plunger B. I do not describe or show in detail such feeding and guiding mechanism, as such devices are well known. I show, however, the special feeding mechanism of the card or stiff paper from a continuous reel for the shells in detail in Figs. 5 and 6, which feeding apparatus is in substitution for the hand-feeding table A and automatically feeds the cut-off blanks in perfect register to the folding-plunger B.

$a$ is the reel of card or paper, which is first prepared by perforations at exact intervals, measuring the required length of blank to be cut, and may also be ready printed. The end of the reel is inserted under the smoothing and clamping finger $a'$ onto a reciprocating feed-table $a^2$, which is reciprocated by a spiral cam device $a^3$ on the counter-shaft $c'$ through the rocking lever $a^4$, the connecting-link $a^5$, and the rocking arm $a^6$, which latter carries on its shaft the feed-finger $a^7$, adapted to engage in the successive perforations on the card or strip. The first pull of the connecting-link $a^5$ to pull the table $a^2$ from the left to right (the easy movement of the table being checked by a friction-pad $a^8$) lifts the finger $a^7$ until home on its tail abutment. The table then travels to meet the strip of card, and the first thrust of the connecting-link $a^5$ lowers the feed-finger $a^7$, when it is caused to engage with the first perforation. The table then entrains with it the strip from right to left, feeding it toward the shears $a^9$ $a^{10}$, the upper one of which receives a reciprocating motion from a grooved cam-plate $a^{11}$ on the shaft $c'$. With the movable shears $a^9$ travels the bar $a^{12}$, having two clamping-studs $a^{13}$, clamping the paper or card near the shears and at the farther end during the shear cut and afterward, while the feed-finger $a^7$ and feeding-table $a^2$ return for engagement in the next perforation. The travel of the feed-table is accurately adjustable as to length of stroke and position during such stroke by the adjustable pin $a^{14}$ in the slot $a^{15}$ of the first rocking lever $a^4$ or in the slot $a^{16}$ of the link $a^5$. In order that the drag upon the card by the feed-finger $a^7$ shall be as easy as possible, the necessary slack from the heavy reel $a$ is made ready for such pull by a lever $a^{17}$, a link $a^{18}$, and a bell-crank $a^{19}$, operated by a face-recessed cam $a^{20}$ on the shaft $c'$, the last member of which, $a^{19}$, presses up a preparatory loop in the strip before the drag of the feed-finger $a^7$ comes on it. The cut-off blank from the strip is in proper position under the plunger B for the next folding operation.

The vertically-reciprocating plunger B is operated by the race-cam C on the shaft $c'$, a roller $c^2$, fixed on the slotted tail $b'$ of the die, engaging in the grooved race of the cam C, the shaft $c'$ obtaining its motion, as in the case of other subsidiary counter-shafts hereinafter mentioned, by bevel-gearing from a longitudinal shaft I, running the whole length of the machine, which is the first-motion shaft. A reciprocating bed D, forming the bottom of the channel in which the shells move toward the packed internal slides or trays, as hereinafter described, is operated by a fixed depending leg $d^3$, having a roller $d^4$ at its end engaging with a grooved race on the other cam $c^3$ on the shaft $c'$.

The table under the plunger B consists of a pair of shutters $b\ b$, Figs. 7 and 8, pivoted in opposite sides of the matrix and held up by springs, so as to open in the center under the descending die and paper blank and permitting the latter to descend into the rectangular well or matrix $b^2$ below the level of the original feed-table. The pressure of the spring-pressed shutters $b\ b$ on the edges of the descending die insures that the blank is uniformly stretched over the lower surface of the die and also insures the proper travel of the blank over the open mouth of the matrix while a large and a small flap are being bent upward by the descent of the die into the matrix upon the reciprocating bed D at the bottom of the matrix. To insure the permanency of the bend of the side flaps, the plunger B has small projecting ribs $b^3$ at its edges, which fit into similar recesses $b^4$ on the bed of the matrix. The die B now rises, and to prevent undue pressure of the large flap of the blank against the die the spring-pressure device $b^6$ on one of the shutters $b\ b$ is arranged, as shown in Figs. 7 and 8, to pass over dead-center as the shutters turn, so that as the shutters become nearly vertical the one opposite to the large flap is drawn away from the die and blank, as in Fig. 8. The catch-arm $b^7$ is thrown forward, so as to be over the fixed trigger $b^8$, which on rising with the die throws back the catch-arm $b^7$, bringing again the spring-pressure device $b^6$ over the dead-center, so that it will cause the shutter $b$ to return to its horizontal position. The other shutter is not in contact with the short flap, which has passed below it, and is therefore spring-pressed only in the ordinary manner.

The reciprocating bed D carries a former or rectangular mandrel $d$, Figs. $9^a$, $9^b$, $9^c$, corresponding to the interior of the case or shell, as desired. The former is self-supported at a minute distance above the upper surface of the bed D beneath it at one end only by a foot-bracket $d^4$ and column $d^7$, which column is attached by a cross-head to a standard $d^6$ on the reciprocating bed D. A through-bolt $d^5$, tapped into the former at the bottom, serves to hold the former $d$, the foot-bracket $d^4$, and the column $d^7$ together. The blank on leaving the matrix can enter under the former, as the sides of the partially-folded blank are perpendicular. The blank is afterward folded over the former and leaves its free end at the farther extremity. The bed D also carries abutments $d'$ $d'$, one of which is the heel of the foot-step $d^4$ of the former attachment, closing the two opposite sides of the matrix when the blank is being forced down, and these abutments $d'$ $d'$ are provided with pivoted spring-pressed detents $d^2$ $d^2$, adapted to spring out and to engage the blank, so as to insure that it remains upon and follows the reciprocating bed and abutment $d'$ when the bed moves the blank out of the matrix. The plunger B now rises entirely free from the blank, which remains upon the reciprocating bed of the matrix, with its two sides bent vertically upward in two flaps, one large, one small. The reciprocating bed D, which was stationary while the plunger B descended and rose, now travels toward the center of the machine by the action of the race-cam $c^3$ on the shaft $c'$, acting on the roller $d^{4\times}$ on a depending leg $d^3$ of the reciprocating bed D. The reciprocating bed D by its outer abutment $d'$ carries the partially-folded blank out of the matrix of the die to its first position for further bending of the side flaps. The blank is held stationary in this position upon return of the reciprocating bed by side face-springs $e$ $e$, Fig. 7$^a$, in the fixed channel-frame. The return of the reciprocating bed D with its attached former $d$ causes the latter to enter into the partially-folded blank, and side spring-fingers E, which are fixed to standards $e'$, which were held back by studs $e^2$ $e^2$ on the presser-bars F, when the latter were in their highest position, to allow the blank to pass in front of them, are now allowed to spring out by the descent of the presser-bars F, a definite fold being thus given to the upper parts of both flaps over the introduced former $d$, and these folds are made definite and permanent by the further downward movement of the pressing-bars F. These are actuated by the plunger B on the one end in its second downward travel on a second blank and by a rod $f$ and cam $f'$, mounted on a counter-shaft $f^2$, operated, as in the case of the shaft $c'$, by bevel-gear from the longitudinal shaft I. This may be considered the first stage in the forming of the complete case or shell after passing out of the plunger-matrix. The reciprocating bed D and the former $d$ attached thereto and situated within the folded shell now make a further travel from left to right, carrying with them the folded shell, by means of the engaging springs $e^3$ $e^3$, both on the upper face of the bed D and the under face of the former $d$. The flaps of the shell open again upward by their own elasticity upon the rise of the pressing-bars F and are brought in this condition with the inside edge of the larger flap opposite to the gluing-roller G. In this second position the shell again remains stationary while the bed D and former $d$ make their return travel, the shell being engaged by springs $e$ in the sides of the channel of the fixed bed-frame in which the shell is traveling.

The gluing-roller G is mounted in a box or trough $g$, containing the glue, which is heated until it has the required consistency. This box and roller have a reciprocating motion across the bed-frame toward the shell produced by a rocking lever $g'$, operated from a face-cam $f^3$ by a roller $f^4$, the cam $f^3$ being upon the counter-shaft $f^2$. The roller G closes one end of the trough, as in an ink-duct, in conjunction with a knife $g^2$, Fig. 9$^a$, the latter being adjustable toward and away from the roller G by a screw $g^3$ and nut or nuts $g^4$, so as to permit a desired film of glue to pass from the box $g$ and surround the periphery of the roller G. A further knife $g^5$, having set-screws $g^6$ to force it home on the roller, is held hard home on the roller to strip therefrom any film of glue after it has passed the gluing-point, which film otherwise might have hardened, and thus prevent the issue of a further film of liquid glue for continuous operation. The roller G is rotated intermittently by an automatic pawl and ratchet-wheel feed, operated by the presser-bar F as it rises, striking and lifting the nose $g^7$ of the handle $g^8$, pivoted on the axle of the roller G, which also carries a feed-pawl. The aforesaid forward movement of the glue box and roller G brings the latter against the inner upper edge of the larger flap of the shell, forcing the latter back until it meets the depending plate $f^5$ from the pressing-bar F, and thus thoroughly glues the edge of the said flap, as shown in Fig. 9$^a$. The depending plate $f^5$ then descending with the presser-bars F presses down the glued larger flap of the shell upon the smaller one, the gluing-rolls G and box being withdrawn from over the path of the shell to permit the closing of the glued flap over the other flap by the descent of the presser-bars F and the depending plate $f^5$. The case or shell now makes a third travel forward with the reciprocating bed D and former $d$ from left to right, as before, engaged by springs $e^3$ $e^3$ on the same, to its next resting-place, where the glued larger flap is again pressed down upon the small flap by a further descent of the pressing-bars F. The shell again rests here, engaged by the side springs $e$ $e$ on the return travel of the reciprocating bed and former. The case or shell makes a fourth step forward from left to right with the reciprocating bed and former until it comes under a heating-block $f^6$ on the presser-bars F.

$f^6$ is a copper plate connected with a copper rod $f^7$, situated in a recess in the body between the bars F, to which a heating-burner $F^8$, Fig. 1$^b$, may be applied, and the block $f^6$ is thus heated and descending with the pressing-bar F again presses the glued flaps together and dries the glue, the shell remaining stationary during this operation, as before described. The shell then makes a fifth step to rollers H H, above and below the shell. These rollers are geared together by cog-wheels $h$ and are rotated always in the same direction by a pawl and two-toothed ratchet-wheel $h'$ $h'$. The pawl $h'$ is driven by a cog-wheel and rack $h^2$ $h^2$, the rack being attached to the reciprocating bed D. The rollers H H in their rotation as the shell travels between them roll the shell firmly upon the former and square up the bent corners of the shell by recesses $h^3$ at the edges of the rollers receiving corresponding ridges upon the former, thus fluting the bent edges of the shell. The rollers also travel over the shell and still more firmly close and press the glued joint of the shell. The pressing-rolls H are fitted with a series of scrapers $h^7$, Fig. 3, to remove any surplus glue, and are provided with little boxes of French chalk $h^6$ to dry and solidify any moist glue to facilitate its removal. During the return travel of the rack and cog-wheel $h^2$ the rollers H remain stationary, being held firmly by a check-pawl $h^4$, pivoted to the fixed bed. At this point of the stationary rest of the rollers H one of the two studs $h^5$, Fig. 3, on the under side of the roller abuts against the edge of the shell, so that upon the return of the former $d$, with the sliding bed D, the shell is now stripped from the former and is a securely-closed case lying in the channel communicating with the folding and packing portion of the machine. During the last forward travel of the bed D and former $d$, which brought the shell under the rollers H, the end of the bed D has passed under a projecting face of a lever J, pivoted upon the main fixed bed of the machine, and has lifted the same, together with another lever $j$ on the same shaft, which latter lever is situated over the path or channel of the finished shell. The lever $j$ is thus lifted out of the way to admit the shell beneath it, and when the former $d$ retires from the inside of the shell the levers J $j$ are permitted to drop to normal position, as shown, slightly closing the mouth of the open shell by depressing the upper face. Upon the next return left to right of the former $d$, with the reciprocating bed D, the former, not being able to enter the partially-closed shell, acts as a pusher against it and causes the shell to make its last and final travel in the channel above mentioned toward the point where it meets and receives the packed slide which it is to enfold or envelop. The said enveloping mechanism and a delivery mechanism for the packed shell-tray is continued in Figs. 10 and 11.

It will now be convenient to recommence the description of the combined packing-machine from the other end to that at which the above description is commenced in order to follow the packing of the slide until it is delivered ready packed to meet the outer shell, as before described, in the center of the machine.

The slides or trays into which the cigarettes or like goods are packed are in a form now well known on the market—viz., an open tray unglued or ungummed, of light card or paper, with the edges turned up at right angles to the bottom and the two end flaps or sides being sufficiently long to turn over the ends of the inclosed cigarettes or goods. The blanks for these slides may be fed from a continuous reel, stamped and cut in any convenient manner, and are folded up and delivered to the packer by a vertically-reciprocating plunger and matrix K, operated from cam mechanism $k$ on a counter-shaft $k'$, similar in character to that described in detail for the making of the shell or cases at the other end of the machine, and the said shells when made are advanced in succession to the packing apparatus by a reciprocating bed $k^2$ in a guiding-channel, the reciprocating bed $k^2$ being provided with a pushing-abutment $k^5$, the shell-guiding channel and the tray-guiding channel, with the respective reciprocating beds, being in line with one another. The present reciprocating bed $k^2$ is operated by the race-cam $k^3$ on a counter-shaft $k'$ through the roller and fixed depending leg $k^4$, similar to the leg $d^3$ and the cam $i^3$, described at the other end of the machine. The slide or tray $j'$, Fig. 13, is thus brought under a packing-plunger M. If only one layer of cigarettes or like goods is required to be packed into the slide or tray, one hopper L and chute $l$ will suffice; but if a double layer is required a duplicate hopper and chute L' and $l'$ is provided on the other side of the packing-plunger M. The bottom $l^2$ and end $l^3$ of the hopper (see detail Figs. 19 and 20) form a rectangular-pointed funnel toward the lateral orifice of issue, which cause a gravity feed of the cigarettes toward the orifice of issue, which leads to the chute $l$, which latter is protected as to its sides by turned-over flanges $l^\times$ to prevent the cigarettes or goods from escaping out of the chute. The bottom of the hopper is provided with a step $l^4$, and the end $l^3$ is pivoted at its center to the sides, so that it can rock backward and forward. This rocking motion is produced by an eccentric motion X and a connecting-rod $x$, the eccentric being driven by a band and pulley $x'$ from a counter-shaft $k'$. The end thus rocks backward toward the bulk of the cigarettes, lifting the weight of the bulk of the cigarettes from the few that have fallen as a lower layer over the step $l^4$, thus allowing those few to freely fall by gravity from the orifice of issue into the protected chute $l$. On the lower edge of the rocking end $l^3$ two or more pliable fingers or brushes $l^5$ are fixed to sweep over the lower layer of cigarettes as they are exposed to keep them lively as to movement and to prevent their jamming by irregularity of position or by loose tobacco or other obstruction. The cigarettes being now in the protected chute in full view of the operator will roll by gravity down the inclined chute $l$ to the lower end, where the inclination of the chute gradually becoming horizontal they are received upon a horizontal plate $l^6$, operated by a slotted arm $l^7$, allowing of waste motion—that is, of a period of rest—by a pin $l^8$, attached to the under reciprocating bed $k^2$. On the far side of the plate $l^6$ is a fixed ridge or stop which checks the roll of the cigarettes, so that a definite and required number lie upon the sliding plate $l^6$ while it is at rest. The sliding plate $l^6$ has a back shoulder $l^{10}$, continued rearward, so as to form a stop at the foot of the chute $l$ when the plate $l^6$ moves forward to the packer M with its charge of cigarettes. The plate $l^6$ and the cigarettes upon it enter into and under the vertically-moving packing-plunger M, lifting a trap-shutter $m$ to enter, such shutter $m$ falling behind the cigarettes to prevent their withdrawal with the plate $l^6$ upon its returning movement empty. Simultaneously with the forward movement of the plate $l^6$ under the packer M the protecting-shoulder $l^{11}$ at the foot of the duplicate cigarette-chute $l$ is also moved forward by a similar pin $l^8$ from the under reciprocating bed, working in a similar slotted arm $l^7$ to that of the plate $l^6$. A duplicate charge of cigarettes is thus received from the second chute onto an under fixed plate at a higher level than that of the plate $l^6$, and upon the return of the moving plate $l^6$ empty, leaving its charge under the packer M, the shoulder and pushing-frame $l^{12}$ partake of this return movement, thus pushing the duplicate layer or charge of cigarettes also under the packer M on top of the first layer or charge left there by the plate $l^6$. Where it is desired to pack a holder or other adjunct with the cigarettes, a convenient space may be partitioned off in the tray on the opposite side to that at which the cigarettes are received, and an additional sloping chute $l^{12}$, Fig. 18, may be provided, by which such a holder or other article may be fed by hand into each tray or shell as they pass in succession to one another. In the case of any tendency to obstruction or hitch to the steady flow of the cigarettes down the inclined chutes $l$ exactly at the required moment onto the horizontal plates in front of them I find it advantageous to use a rocking flexible finger or brush Q, Figs. 16 and 17, adapted to brush lightly over the cigarettes in the lower part of the chute $l$. On its upward travel it prevents the cigarettes from pressing too heavily upon the lower stop and stirs them upward, and upon its return downward travel it helps to instantaneously start the flow of cigarettes onto the horizontal reception-plate at the right moment. The brush Q is mounted on a spring-pressed horizontal axle $q$, attached by a bracket $q'$ to the fixed bed of the machine, and the said axle is rocked to and fro by an arm $q^2$ and pin $q^3$, moved in one direction against a spring-recoil, fitted about the axle $q$ by a rigid bar or trigger $q^4$, fixed to the vertically-moving bar $m^3$, attached to the reciprocating die-plunger K. The cigarettes either in one or two layers, as in Figs. 12, 13, and 14, now rest on inwardly-protruding spring wings or edges $m'$ $m'$, which are carried in a bridle adapted to slide up and down between stops on the main moving head $m^2$ of the packer, which receives a reciprocating movement by the rigid arm $m^3$ from the reciprocating die K. The downward movement of this main head $m^2$ and spring-wings $m'$ is limited by a detent $m^4$ coming in contact with a projection $m^5$ on the fixed sleeve $m^6$ of the packer, which is supported by an arm attachment $m^7$ to the fixed bed of the machine. The arm $m^3$, producing the downward movement of the packer-head, however, still continues its movement, and thus the head thrusts its way through the spring-wings $m'$ $m'$, forcing these apart by inclined wedge-faces $m^8$, thus releasing the cigarettes and allowing them to fall into the slide or tray beneath the packer-head, as shown in dotted lines, Fig. 12. The extreme head of the packer N travels on until it comes in contact with the layers of cigarettes as they lie in the tray or slide to insure that they all lie even and of a required depth to fit eventually into the shell, and the cigarettes are thus packed into the tray or slide. The head N can, however, slide upward into the main head $m^2$, being held therein by studs on either side of the spindle, lying in oval grooves $n$ in the main head $m^2$. The head N is lightly spring-pressed by a spring $n'$ to its normal extreme position. In case of any undue accumulation of cigarettes under the packer M by reason of any failure in the supply of trays or slides or in case of any undue obstruction to the proper downward travel of the head N it rises against the spring-pressure of $n'$ and by means of a vertical rack $n^2$, attached to it, operates a spring-trigger $n^3$ of a hammer-bell $n^4$, which thus gives audible indication that all is not as it should be under the packer, and the operations can be stopped without further damage ensuing. As the usual form of tray or slide used for such purpose has the two end folds of considerable length, standing up more or less vertically until the cigarettes are packed within the tray and slide, after which they are folded down over the goods, it is necessary to insure that these ends are sufficiently open to receive the cigarettes without fouling them or the end of the packer. As the slide or tray is passing to its point of rest under the packer M, I provide a horizontally-moving finger P, Figs. 16, 17, and 18, pivoted in the side of the channel in which the slide or tray is moving, which is caused by the engagement of a stud $p$, affixed to the sliding bed $k^2$, to come sharply outward at the right moment, and presses the leading edge of the slide or tray outward and beyond a small detent, that prevents it moving back again until after the slide has been filled and moves on again. The said finger is removed before the packer M descends and delivers its charge of cigarettes. The rearward edge of the tray is also held back out of the perpendicular as it comes under the packer by a detent in the side of the channel in which the tray or slide moves. The slide or tray now packed with the desired number of cigarettes or goods in one or two layers passes on, as before described, in its channel by the action of the under reciprocating bed $k^2$ to meet the shell already formed, glued, and closed and is delivered the one into the other at their point of meeting.

Figure 18:
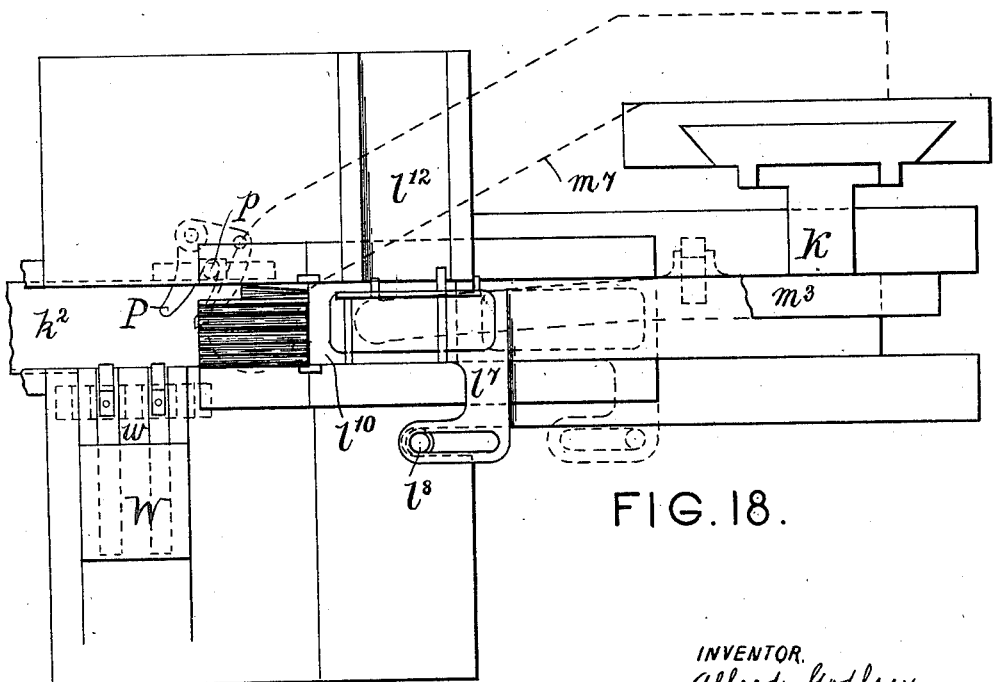
Figure 17:
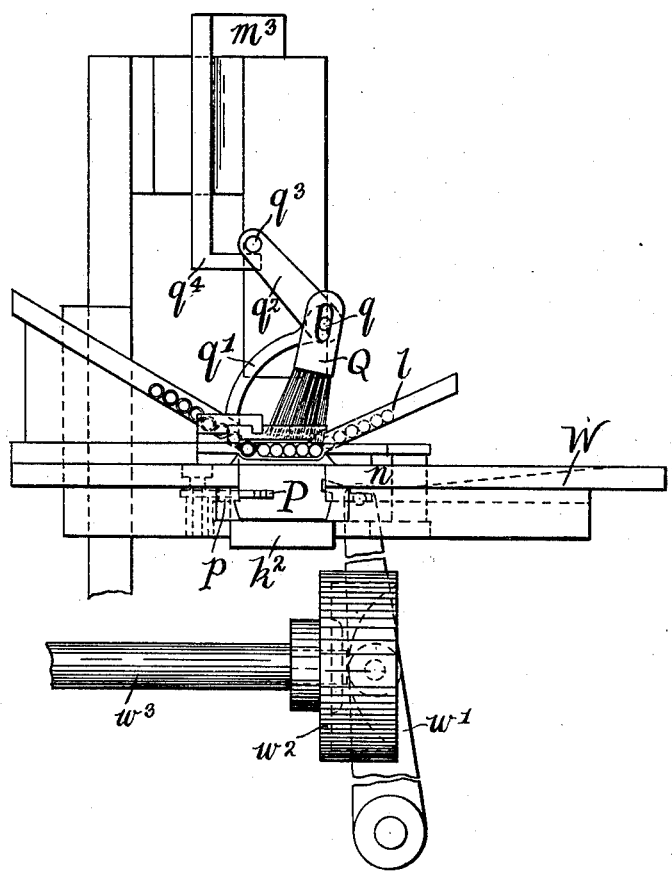

If it is desired to add photographs to the cigarette-slides, an auxiliary feed-table W is provided, Figs. 17 and 18, with a sliding plate $w$ at foot. The said sliding plate is operated by a rocking lever $w'$ at the proper time to suit the passing trays or slides, the said rocking lever receiving its motion by a face-cam $w^2$ on a counter-shaft $w^3$, driven, as in the case of the other counter-shafts, from the longitudinal shaft I.

The packed slides or trays from the one end of the machine and the glued shells from the other end are delivered in a continuous stream one by one (one packed slide being end to end with a glued shell, the latter being checked by a fixed overhead detent $r^4$) into a transverse switching device R, which is reciprocated from side to side by means of a cam $r$, carried on the shaft $r'$. This switching device is provided with a vertical rib $r^2$, which on one stroke pushes both a packed slide and a shell to one side and on the other stroke the next slide and shell in sequence to the opposite side. Directly the filled slide has reached its position the back flap of the tray or slide is closed by a pressing-finger $r^5$, keyed to a shaft $r^6$, which is itself carried on rocking arms $r^7$, mounted on the bed-plate. The shaft $r^6$ and the pressing-fingers $r^5$ receive an oscillating movement at the right time by the arm $r^{10}$ from the bed-plate and a cam $r^{11}$, mounted on the shaft $k'$, operating upon a roller at the end of the connecting-rod $r^9$. Immediately this is effected a reciprocating pusher $r^3$, which, as shown, is traveling back to its rearmost position and is carried and actuated by the same mechanism as the reciprocating bed $k^2$, pushes the packed slide or tray into its glued and completed shell, which lies end to end to it. This goes on alternately on each side as the switching device R is reciprocated from side to side, a filled and packed tray inclosed in an outer shell being delivered at each stroke of the horizontal rib $r^2$. I provide on each side a pivoted arm T, which has a projecting finger $t$, adapted to engage itself behind the filled box, so as to pull it out of the machine. These arms are carried by the switching device R, and each arm is pivoted and adapted to be raised on the return stroke high enough to clear the shell which the rib $r^2$ has removed on the previous stroke. This movement is effected by means of the lever $t'$, attached to the shaft $t^2$ of the arm $t^3$, which is actuated by its cam $t^4$, mounted on the shaft $r'$. The cams $t^4$ are arranged opposite to one another, and therefore raise the arms alternately. I make use of these arms also to indicate that the packed shells are exactly of required form and thickness. A flange at the side of the arms T comes down upon the upper face of the shell. If, therefore, there is any excess of thickness or irregularity in the packing of the slide therein, the arms T may either of them not drop down to the desired normal position upon the bed-plate. This causes the arm $t^3$, resting by its weight upon the cam $t^4$, not to lie close to the surface of the cam, and in this case the tail $t^5$ of the arm $t^3$ in its lateral movement with the switching device R comes in contact with the trigger $t^6$ of an alarm-bell $t^7$, which is sounded, and audible notice is given of some irregularity in the finished package or box.

Having now described my invention, what I claim, and desire to secure by Letters Patent, is—

1. In combination, a plunger mechanism for forming a shell or outer case from a constant succession of blanks at one end of a fixed bed; mechanisms for forming, and packing with cigarettes, a slide or inner tray from a succession of blanks at the other end of said bed; reciprocating means in guiding-channels linable with one another, adapted to transmit the formed shells and packed slides or trays successively, in intermittent steps, from either end of the bed respectively, to meet at a common center; means on said guiding-channels for the forming, gluing and completion of said shells without deformation of the rectangular shape of the shell, and for the packing and closing of said trays; a mechanism in the center of the bed adapted to insert the packed slide into the closed and glued rectangular shell, and to deliver the same transversely to their movement of relative approach in said guide-channels; counter-shafts operating said mechanisms; and a single longitudinal first-motion shaft operating said counter-shafts in time unison with one another.

2. In combination, a plunger mechanism for forming a shell or outer case, means for folding, gluing, drying, and pressing said shell without deformation of rectangular shape, a reciprocating bed in guiding-channel with spring-detents for advancing said shell intermittently to its various operations, and to position to receive an inner packed slide; a packing mechanism adapted to feed, lay, and pack by a spring-pressed head cigarettes or like goods into an inner tray or slide; a sound-indicator operated by abnormal movement of said spring-pressed packing-head, to give notice as to obstruction in packing; a reciprocating bed in a guide-channel for advancing said packed slide lineally with and in an opposite direction to the closed and glued shell; means for delivering same when inclosed within one another; a sound-indicator operated by abnormal position of delivering pivoted fingers and transverse movement of delivery mechanism to give notice as to irregularity of packed slide and shell; counter-shafts operating said mechanisms, and a first-motion shaft operating said counter-shafts in time unison one with another.

3. In combination; means for feeding material for shells from a continuous roll; a device adapted to clamp the sheet before and while shearing and unwinding from the reel; perforations in said continuous sheet; a rocking finger adapted to first close down and engage with perforation of sheet, and then to draw and feed same to shears; means for adjustment of operating-lever of feed-motion, to alter length and position of the feed, shears for cutting lengths of material into rectangular blanks; means for folding, gluing and drying same; means for advancing same intermittently to its various operations and to a position to receive an inner packed slide; a packing mechanism adapted to feed, lay, and pack cigarettes or like goods into an inner tray or slide; means for advancing said packed slide into the closed and glued shell; counter-shafts operating said mechanisms; and a single longitudinal first-motion shaft operating said counter-shafts and mechanisms, in time unison, one with another.

4. In combination, a shell or outer-case feeding mechanism; a reciprocating plunger for folding blank into hollow rectangular shell; a divided spring-pressed flap-table under the said plunger, means for retiring one flap from touching said plunger after descent; a trigger for returning such flap to the horizontal on ascent of the plunger; a reciprocating bed to the matrix under said plunger; detent-springs on said bed preventing the blank from following the ascending die, and retaining said blank on the reciprocating bed; means for further folding, gluing and drying shell; means for advancing it intermittently to its various operations, and to a position to receive an inner packed slide; a packing mechanism adapted to feed, lay, and pack cigarettes or like goods into an inner tray or slide; means for advancing said packed slide into the closed and glued shell; counter-shafts operating said mechanisms; and a single longitudinal first-motion shaft operating said counter-shafts and mechanisms in time unison one with another.

5. In combination, a shell or outer-case forming and feeding mechanism; means for folding same; means for gluing and drying same; a reciprocating bed at the bottom of a guiding-channel; a guiding-channel having face-springs in the sides of said channel; face-springs on reciprocating bed; a packing mechanism adapted to feed, lay, and pack cigarettes or like goods into an inner tray or slide; a duplicate reciprocating bed at the bottom of a guiding-channel, advancing said packed slide lineally with and in an opposite direction to the closed and glued shell; counter-shafts operating said mechanisms; and a first-motion shaft operating said counter-shafts in time unison one with another.

6. In combination, a shell or outer-case forming and feeding mechanism; means for first folding same; a guiding-channel with reciprocating bed therein; spring-pressed fingers on each side of said guiding-channel; means for pressing back and releasing said spring-fingers to further fold flaps of shell; means for gluing and drying and pressing same; means for advancing same intermittently to its various operations and to a position to receive an inner packed slide; a packing mechanism, adapted to feed, lay and pack cigarettes or like goods into an inner tray or slide; means for advancing said packed slide into the closed and glued shell; counter-shafts operating said mechanisms; and a first-motion shaft operating said counter-shafts in time unison one with another.

7. In combination, a shell or outer-case forming mechanism; means for folding same; a vertically-reciprocating pressing-bar connected to the folding-die, adapted to press down flaps of shell; a vertically-depending anvil-plate connected to said pressing-bar, holding up flap of shell to glue roller; mechanism adapted to present glue to flap of shell; means for drying and pressing same; means for advancing the same intermittently to its various operations, and to position to receive an inner packed slide; a packing mechanism adapted to feed, lay, and pack cigarettes or like goods into an inner tray or slide; means for advancing packed slide into the closed and glued shell; counter-shafts operating said mechanism; and a first-motion shaft operating said counter-shafts in time unison one with another.

8. In combination, a shell or outer-case forming and folding mechanism; a reciprocating glue-box, adapted to move transversely to travel of shell; means for drying and pressing shell; means for advancing same intermittently to its various operations and to its position to receive an inner packed slide; a packing mechanism adapted to feed, lay, and pack cigarettes or like goods into an inner tray or slide; means for advancing said packed slide into the closed and glued shell; counter-shafts operating said mechanisms; and a first-motion shaft operating said counter-shafts in time unison one with another.

9. In combination, a plunger mechanism adapted to form outer shell or case; folding and gluing mechanisms; a pressing-bar connected to the reciprocating plunger of forming mechanism, reciprocating vertically to glued shell; a heat-conducting block on said pressing-bar; means for beating the said block; means for press-rolling said glued and dried shell; means for advancing same intermittently to its various operations and to position to receive an inner packed slide; a packing mechanism adapted to feed, lay and pack cigarettes or like goods into an inner tray or slide; means for advancing said packed slide into the closed and glued shell; counter-shafts operating said mechanisms; and a first-motion shaft operating said counter-shafts in time unison one with another.

10. In combination, a shell or outer-case forming, folding, gluing, pressing and drying mechanism; a reciprocating bed in guide-channel with detent-springs, intermittently advancing the shell; an internal mandrel or former attached to said reciprocating bed; a pair of pressing-rolls embracing said former, operated in one direction only by reciprocating bed; stripping-studs on said rolls for removing shell from former or mandrel on said reciprocating bed; a pressing-lever operated by reciprocating bed adapted to close the mouth of the stripped shell; means for advancing shell intermittently through its various operations and finally to position to receive an inner packed slide; a packing mechanism adapted to feed, lay, and pack cigarettes or like goods into an inner tray or slide; means for advancing packed slide into the closed and glued shell; counter-shafts operating said mechanisms; and a first-motion shaft operating said counter-shafts in time unison one with another.

11. In combination, a shell or outer-case forming, folding, gluing, pressing and drying mechanism; a reciprocating conveyer for advancing shell intermittently through its various operations and to position to receive internal packed slide; an internal former attached to such reciprocating conveyer; a stripping device for removing shell from internal former; a feeding-hopper and gravity-chute adapted to intermittently feed cigarettes or like goods onto a reciprocating plate; a reciprocating packer-head adapted to receive, retain, lay and pack cigarettes or like goods into an inner tray or slide; a reciprocating conveyer for advancing packed slide into the closed and glued shell; counter-shafts operating said mechanisms; and a first-motion shaft operating said counter-shafts in time unison one with another.

12. In combination, a shell or outer-case forming, folding, gluing, pressing and drying mechanism; a reciprocating conveyer for advancing the shell intermittently through its various operations and to position to receive internal packed slide, an internal former on said reciprocating conveyer; a stripping device for removing glued shell from former; a feeding-hopper and gravity-chute adapted to intermittently feed cigarettes or like goods onto a reciprocating plate of a conveyer; a duplicate hopper or gravity-chute adapted to intermittently feed cigarettes or like goods onto fixed plate; a reciprocating pusher at foot of duplicate chute delivering duplicate layer of cigarettes onto those carried by conveyer-plate of other chute; a reciprocating packer-head, adapted to receive and retain duplicate layers of cigarettes, and to lay and pack said cigarettes or like goods into an inner tray or slide; a reciprocating conveyer for advancing packed slide into the closed and glued shell; counter-shafts operating said mechanisms; and a first-motion shaft operating said counter-shafts in time unison one with another.

13. In combination, a shell or outer-case forming, folding, gluing, pressing, and drying mechanism; a reciprocating conveyer for advancing the shell intermittently to its various operations and to position to receive internal packed slide; a former attached to said reciprocating conveyer; a stripping device for removing glued shell from internal former; feeding-hoppers and gravity-chutes adapted to intermittently feed cigarettes or like goods to a packer-head; a reciprocating packer-plunger, having an internal spring-pressed auxiliary head; spring-flanges below same, supporting the ends of cigarettes; means for allowing release of cigarettes from said spring-flanges into slides or trays; a sound-indicator operated by abnormal movement of said internal spring-pressed head, to give notice of undue obstruction in packing; a reciprocating pusher for advancing packed slide into the closed and glued shell; a delivery mechanism of packed slide and shell; a sound-indicator operated by abnormal position of delivery-fingers and by transverse movement of delivery mechanism, to give notice should packed goods be irregular; counter-shafts operating said mechanisms; and a first-motion shaft operating counter-shafts in time unison one with another.

14. In combination, a reciprocating feed-table having a perforated strip of paper or like material presented to or from a reel; a rocking feed-finger pivoted on said table, adapted to enter a perforation of strip of paper, having a butt-hinge determining rock of finger up and down; a connecting-rod operating said rocking feed-finger; a cam-operated rocking lever, moving said connecting-rod; slots in said rocking lever and connecting-rod, at point of attachment; a connecting-bolt through said slots adapted to adjust throw and position of feed; a shear-blade on a sliding shear-head transverse to and above said paper strip; means for reciprocating said shear-head; a clamping-bar attached to said shear-head, adapted to clamp the paper strip at two places on feed-table, before, and while shearing and unwinding from the reel; a cam-moved unwinding or lifting bar applied to the paper strip; and a counter-shaft having cam mechanisms working said devices, operated in time unison from the first-motion shaft of the machine.

15. In combination, a reciprocating plunger for folding a blank into a hollow rectangular shell; a matrix under the said plunger; a divided spring-pressed flap-table closing the mouth of the said matrix; a spring, connected to an arm of one of said flaps, so as to pass over dead-center as flap depresses; a trigger on reciprocating plunger, adapted to engage with finger on flap-axis, to return said flap over dead-center as the folding-plunger descends; a reciprocating bed, forming bottom of matrix; an abutment on reciprocating bed forming end of matrix and adapted to move folded blank from the matrix; detent-springs on reciprocating bed at the sides of the matrix securing blank on reciprocating bed; detent-springs on sides of egress-channel from matrix, preventing blank from returning with return travel of reciprocating bed; a mandrel or internal former attached to reciprocating bed, adapted to enter into first-folded blank; and counter-shafts with cam mechanisms adapted to move said devices, operated in time unison by first-motion shaft of the machine.

16. In combination, a reciprocating bed conveying partially-folded blank within a guiding-channel; two spring-fingers pivoted on fixed standards situated on fixed bed on either side of said guiding-channel; a reciprocating bar connected to reciprocating folding-plunger, traveling vertically between said spring-fingers; studs on said bar adapted to open said spring-fingers on ascent of bar, and to permit them to spring forward on descent of bar, to fold the side flaps of the blank over internal former; counter-shafts with cam mechanisms adapted to move said devices, operated in time unison by first-motion shaft of the machine.

17. In combination, a glue-box adapted to reciprocate at right angles to travel of blank; means for reciprocating said glue-box; a glue-distributing roller forming the front of the box; means for determining the thickness of the film of glue and for stripping dried glue therefrom; a vertically-reciprocating folding-plunger; a vertically-reciprocating presser-bar connected to folding-plunger; a depending plate therefrom acting as an anvil to receive pressure of gluing-roller, and pressing down glued flap on retirement of roller; a pawl-feed to glue-roller, operated by said presser-bar; counter-shafts with cam mechanisms adapted to move said devices, operated in time unison by first-motion shaft of the machine.

18. In combination, a pair of pressing-rollers, adapted to receive former and shell thereon between them; recesses on rollers coinciding with ridges on former to set up and define rectangular bends of shell; gearing between rolls to enable them to revolve in unison; a reciprocating bed; a pawl-feed operated by rack on reciprocating bed and a check-pawl, to determine intermittent rotation of rollers in same direction and a rest between; studs projecting from periphery of rollers adapted to strip shell from former upon return motion of the latter; a closing-lever, lifted and allowed to fall by reciprocating bed, causing the shell to partially close, and the former to feed the shell forward to receive the packed slide; a counter-shaft with cam mechanism moving said reciprocating bed, and operated in time unison by first-motion shaft of the machine.

19. In combination, a receiver or hopper for cigarettes or like goods having a fixed inclined base with gravity-feed to lateral source of issue; a fixed step in the bottom of hopper; a rocking front to said hopper adapted to just clear said step in inward movement; means for rocking same; stroking-brushes attached to said rocking front; an open gravity-chute; flanges to chute retaining ends of cigarettes in chute; a reciprocating wiping-brush at end of chute; means for reciprocating same; a reciprocating bed carrying plate fences and pusher across end of chute; counter-shafts with cam mechanisms adapted to move said devices, operated in time unison by first-motion shaft of the machine.

20. In combination, a reciprocating packing-plunger; means for producing such reciprocation, an auxiliary packing-head sliding in said plunger and spring-pressed; a trap-shutter at one side of said auxiliary packing-head; a reciprocating plate carrying charge of cigarettes through said trap-shutter; spring-wings supporting ends of cigarettes attached to a bridle adapted to slide up and down between stops on main packing-plunger; a reciprocating pusher delivering duplicate layer of cigarettes above former charge; a fixed stop arresting bridle on downward movement of plunger; wedge-faces on plunger, opening said spring-wings and allowing cigarettes to fall into tray or slides; a sound-indicator as to undue obstruction to packer-head; counter-shafts with cam mechanisms adapted to move said devices, operated in time unison by first-motion shaft of the machine.

21. In combination, a vertically-reciprocating packer-plunger; a horizontal reciprocating bed adapted to carry an open tray or slide thereunder; a horizontally-moving finger, pivoted on the side of the channel in which the slide travels; a stud on said reciprocating bed engaging with said pivoted finger, and causing it to bend the leading flap of the tray outward; a detent in side of channel preventing flap from returning, until the slide has moved on packed, and counter-shafts with cam mechanisms adapted to move said devices, operated in time unison by the first-motion shaft of the machine.

22. In combination, a delivery-table, moving transversely to travel of shells and slides; fingers or bars pivoted on said delivery-table adapted to lift when traveling in one direction, and to come down between shells when about to travel in the other direction; flanges on said fingers gaging the thickness of packed shell and slide; cams and levers for operating said fingers; a sound-indicator operated by lever-tail when said flange-fingers meet with an undue obstruction or thickness of packed shell; counter-shafts with cam mechanisms adapted to move said devices operated in time unison by first-motion shaft of the machine.

23. In a cigarette-packing machine the combination with a reciprocating packer-plunger, having an internal spring-pressed auxiliary head, of a sound-alarm operated by the abnormal movement of the said spring-pressed head, and adapted to indicate any undue obstruction under said packer-head.

24. In a cigarette-packing machine the combination with delivering mechanism, adapted to deliver the finally-packed slide and shell, of a sound-alarm, operated by the abnormal position of pivoted delivery-fingers, and by the reciprocation of the delivery mechanism, adapted to indicate the irregular shape or undue thickness of such packed goods.

25. In a cigarette-packing machine, the combination of a plunger-shell-forming mechanism, having devices for folding, gluing and pressing the said shells in an open rectangular form, with mechanism adapted to pack cigarettes within a slide and the slide within the said shell, and to deliver the said packed shell-slide.

26. In a cigarette-packing machine, the combination of a reciprocating bed, forming the bottom of a guiding-channel, with face-springs spaced at regular intervals slightly shorter than the travel of the said reciprocating bed, upon the sides of said channel and the upper face of said bed, and projecting from said sides and face, so as to engage the material, to effect an intermittent travel of the same in a given direction.

27. In a cigarette-packing machine the combination of a reciprocating bed and a former attached thereto, having raised ridges along each edge of said former, with a pair of geared pressing-rollers, one on each side of said former having recesses at each edge of such rollers, corresponding to the ridges on said former, to groove rectangular corners of the shell, making the bend more definite and permanent.

28. In a cigarette-packing machine the combination with a plunger-shell-folding mechanism, having a reciprocating bed for the bottom of the matrix, of spring-detents situated on the said reciprocating bed at those sides of the plunger-well at which the shell-blank is not turned up, adapted to spring out and engage over the edges of the bottom flat part of the blank to cause the latter to be retained by the reciprocating bed when it moves from under the plunger.

29. In a cigarette-packing machine, the combination with a cigarette-hopper, having an inclined bottom and ends to give gravity-feed of cigarettes toward lateral orifice of issue, of a projecting fixed step in the bottom of said hopper, situated so that its edge just clears the inward swing of a hinged and moving front, to clear layer of cigarettes which have dropped over the step, from the superincumbent weight, so that they are free to continue their fall from orifice of issue.

In witness whereof I have hereunto set my hand in presence of two witnesses.

ALFRED GODFREY.

Witnesses:
REGINALD WILLIAM JAMES,
RICHARD A. HOFFMANN.